US009106592B1

(12) United States Patent
Arimura et al.

(10) Patent No.: US 9,106,592 B1
(45) Date of Patent: Aug. 11, 2015

(54) CONTROLLER AND METHOD FOR CONTROLLING A BUFFERED DATA TRANSFER DEVICE

(75) Inventors: Kenneth K. Arimura, Iveine, CA (US); Gregory B. Thelin, Garden Grove, CA (US); Rebekah A. Wilson, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1831 days.

(21) Appl. No.: 12/122,708

(22) Filed: May 18, 2008

(51) Int. Cl.
*G06F 3/00* (2006.01)
*G06F 5/00* (2006.01)
*H04L 12/861* (2013.01)
*G06F 5/06* (2006.01)

(52) U.S. Cl.
CPC ............... *H04L 49/90* (2013.01); *G06F 5/065* (2013.01)

(58) Field of Classification Search
None
See application file for complete search history.

(56) References Cited

U.S. PATENT DOCUMENTS

| | | | |
|---|---|---|---|
| 5,163,140 A * | 11/1992 | Stiles et al. | 711/140 |
| 5,231,633 A * | 7/1993 | Hluchyj et al. | 370/429 |
| 5,450,546 A | 9/1995 | Krakirian | |
| 5,537,552 A | 7/1996 | Ogasawara et al. | |
| 5,563,891 A | 10/1996 | Wang | |
| 5,822,142 A | 10/1998 | Hicken | |
| 6,009,231 A | 12/1999 | Aoki et al. | |
| 6,191,712 B1 | 2/2001 | Still | |
| 6,336,150 B1 | 1/2002 | Ellis et al. | |
| 6,385,711 B1 | 5/2002 | Colligan | |
| 6,658,016 B1 * | 12/2003 | Dai et al. | 370/424 |
| 6,674,754 B1 * | 1/2004 | Ofek | 370/389 |
| 6,735,679 B1 * | 5/2004 | Herbst et al. | 711/167 |
| 6,751,686 B2 | 6/2004 | Takasugi et al. | |
| 6,766,388 B2 * | 7/2004 | Gerhart | 710/58 |
| 6,842,801 B2 | 1/2005 | Yamada | |
| 7,085,087 B2 | 8/2006 | Fukuhisa et al. | |
| 7,120,084 B2 | 10/2006 | White et al. | |
| 7,242,736 B2 | 7/2007 | Schanke et al. | |
| 7,249,206 B2 | 7/2007 | Bilak et al. | |
| 7,287,102 B1 | 10/2007 | White et al. | |
| 7,317,706 B1 * | 1/2008 | Hao et al. | 370/330 |
| 7,496,689 B2 * | 2/2009 | Sharp et al. | 709/250 |
| 7,603,137 B1 * | 10/2009 | Elliott | 455/552.1 |
| 2002/0051460 A1 * | 5/2002 | Galbi et al. | 370/412 |

(Continued)

OTHER PUBLICATIONS

Author: Hui et al., Title: Client-Server Synchronization and Buffering for Variable Rate Multimedia Retrievals, Publication: IEEE Journal on Selected Areas in Communications, Edition: vol. 14 No. 1, Date: Jan. 1996, p. 226-236.*

*Primary Examiner* — Henry Tsai
*Assistant Examiner* — Christopher Bartels

(57) ABSTRACT

Controlling a buffered data transfer between a source and a destination by loading a source count value and a destination count value from a buffered data transfer device. A source delta value is computed by subtracting a source previous value from the source count value. The destination count value is adjusted on the buffered data transfer device by adding the source delta value to the destination count value. A destination delta value is computed by subtracting a destination previous value from the destination count value. The source count value is adjusted on the buffered data transfer device by adding the destination delta value to the source count value. A new value for the source previous value is computed by adding the source count value and the destination delta value. A new value for the destination previous value is computed by adding the destination count value and the source delta value.

21 Claims, 3 Drawing Sheets

(56) References Cited

U.S. PATENT DOCUMENTS

| | | | |
|---|---|---|---|
| 2002/0124149 A1* | 9/2002 | Ni | 711/170 |
| 2003/0056059 A1 | 3/2003 | Fox et al. | |
| 2003/0105940 A1* | 6/2003 | Cooksey et al. | 711/203 |
| 2004/0013119 A1* | 1/2004 | MeLampy et al. | 370/395.21 |
| 2004/0083387 A1* | 4/2004 | Dapp et al. | 713/201 |
| 2004/0103193 A1* | 5/2004 | Pandya et al. | 709/224 |
| 2004/0202073 A1* | 10/2004 | Lai et al. | 369/47.33 |
| 2004/0216113 A1* | 10/2004 | Armstrong et al. | 718/104 |
| 2005/0114562 A1* | 5/2005 | Barnes et al. | 710/29 |
| 2005/0120173 A1* | 6/2005 | Minowa | 711/114 |
| 2005/0154838 A1* | 7/2005 | DeWitt et al. | 711/144 |
| 2005/0177657 A1* | 8/2005 | Pope et al. | 710/36 |
| 2006/0179204 A1* | 8/2006 | Cohen et al. | 710/316 |
| 2006/0282421 A1* | 12/2006 | Cadarette et al. | 707/4 |
| 2007/0083742 A1* | 4/2007 | Abernathy et al. | 712/244 |
| 2007/0294410 A1* | 12/2007 | Pandya et al. | 709/226 |
| 2008/0112318 A1* | 5/2008 | Groleau et al. | 370/230.1 |
| 2008/0263285 A1* | 10/2008 | Sharma et al. | 711/147 |
| 2009/0292575 A1* | 11/2009 | Ellebracht et al. | 705/8 |
| 2011/0191094 A1* | 8/2011 | Quernermoen et al. | 703/21 |

* cited by examiner

CONTROLLER AND METHOD FOR CONTROLLING A BUFFERED DATA TRANSFER DEVICE

BACKGROUND

Computer systems may have a need to perform bulk data transfers. For example, a substantial amount of data may be transferred from a mass storage device such as a hard disk drive to an area of random access memory (RAM) in preparation for processing the data. In another example, a substantial amount of data may be transferred from a communication channel such as an Internet connection to a mass storage device such as a hard disk drive for later use by the computer.

The overall rate of such transfers generally is the same for the source and the destination as the slower of the two determines the rate. However, one or both of the source and the destination may have a transfer rate that varies during the course of a data transfer. For example, a hard disk drive may transfer data at a high rate of speed when the data is in consecutive sectors on the same track. On the other hand, there may be a substantial period of time in which no data is transferred when it is necessary to access a non-consecutive sector, particularly if the needed sector requires the heads of the drive to seek another cylinder.

Since the slower of the source and the destination generally determines the transfer rate, a buffer memory is generally used between the source and the destination. The data transfer is arranged to be from source to buffer and buffer to destination. The buffer may be designed so that it is always able to transfer data at the maximum rate provided by the source and the destination. The source may therefore transfer to the buffer at the source's maximum speed as long as there is buffer memory available. The destination may transfer from the buffer at the destination's maximum speed as long as there is data available in the buffer memory. This may increase the overall data transfer rate as the source and the destination may not be affected by momentary slowdowns of one another thus increasing the average transfer rate of the slower of the two.

The data transfer may be managed by a buffered data transfer device that receives data from the source, stores it temporarily in the buffer memory, and then provides it to the destination. The buffered data transfer device may manage the buffer memory using a memory management strategy such as a circular buffer to accommodate transfers of more data than can be held by the buffer memory. The memory management strategy keeps track of the amount of data that is stored in the buffer. The source is prevented from making further transfers if the buffer is full. The destination is prevented from making further transfers if the buffer is empty.

The buffered data transfer device allows the source and the destination data transfers to operate as two parallel threads that are generally synchronized by the count of the amount of data that is stored in the buffer. The source thread increases the count by transferring data to the buffer. The destination thread decreases the count by transferring data from the buffer. If the source is faster than the destination, the source will be slowed because it will fill the buffer from time to time. If the destination is faster than the source, the destination will be slowed because it will empty the buffer from time to time. It is possible that both the source and the destination will be slowed at various times during a single transfer.

While a buffered data transfer device provides advantages in terms of providing a higher data transfer rate, it would be desirable to provide a mechanism to take further advantage of the buffered data transfer.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
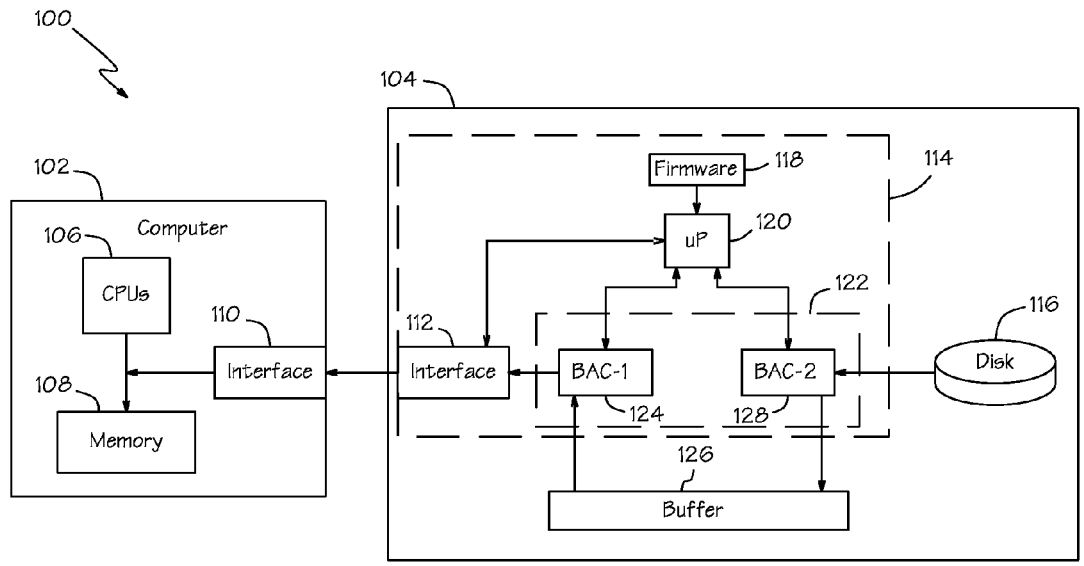
FIG. 1 is a block diagram of a computer system that includes an embodiment of the invention.

FIG. 1 is an exemplary computer system 100 that includes an embodiment of the invention. The exemplary computer system 100 includes a processor 102 and a mass storage device 104. The processor may include one or more central processing units (CPUs) 106 that are coupled to memory 108 that stores programs and data to be used by the CPUs.

The exemplary mass storage device 104 is illustrated by a disk drive. The disk drive includes disk storage media 116 that stores data such as by magnetic recording and a controller 114 that controls the operation of the storage media and manages the transfer of data between the storage media and the processor 102. The mass storage device 104 may be coupled to the processor 102 by a cable that couples two interfaces 110, 112. The interfaces may be any of a variety of interfaces that support transfer of data and commands between the processor 102 and the mass storage device 104 such as Small Computer System Interface (SCSI), Serial Attached SCSI (SAS), Advanced Technology Attachment (ATA), Serial ATA (SATA), or Fibre Channel.

The controller 114 includes a buffered data transfer device 122 that includes buffer access circuits 124, 128 that manage data transfers to and from a buffer memory 126. The controller may further include a microprocessor 120 or programmable microcontroller that controls the operations of the buffered data transfer device 122. The microprocessor 120 may be coupled to firmware 118 which may be a nonvolatile memory that stores a sequence of instructions that are executed by the microprocessor to determine how the controller functions.

The controller 114 may be an integrated circuit (IC) that includes various functional modules, which may provide for the writing and reading of data stored on storage device 116.

The microprocessor 120 may transfer data, address, timing and control information to and from the buffered data transfer device 122. Buffer memory 126 may be coupled to the controller 114 via ports to facilitate transfer of data, timing and address information. Buffer memory 126 may be any of a variety of memory types that provide the ability to read and write data at high speeds such as a double data rate (DDR) memory or synchronous dynamic random access memory (SDRAM).

Figure 2:
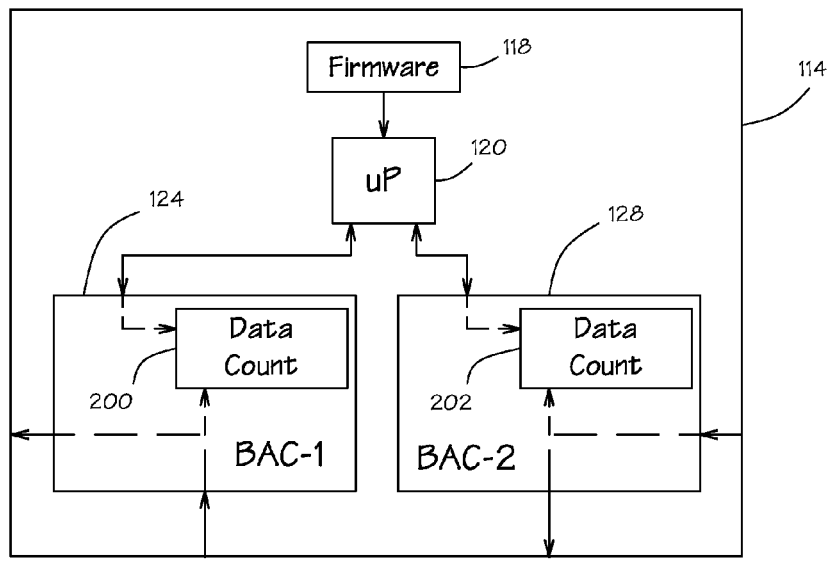
FIG. 2 is a block diagram of a controller for controlling a buffered data transfer device that transfers data between a source and a destination according to one embodiment.

FIG. 2 is an exemplary block diagram that shows some features of the controller 114 according to one embodiment. The buffer access circuits 124, 128 included in the buffered data transfer device 122 (FIG. 1) are shown as two separate logical blocks but they may be implemented using hardware that may be shared by two or more buffer access circuits. As suggested by the dashed line showing a data path between an external device such as the disk storage media 116 (FIG. 1) and the buffer memory 126 (FIG. 1), the buffer access circuits 124, 128 provide the circuits necessary to manage the transfer between a device and the buffer memory. The buffer access circuits 124, 128 may include elements such as transfer counters and address pointers that control data transfers.

In particular, the buffer access circuits 124, 128 may include a data count that indicates the amount of data in the buffer memory that is associated with the transfer being processed by the buffer access circuit associated with the particular data count. The data count may be maintained directly as a single value or indirectly such as by the difference between address pointers to the start and end of the region of buffer memory occupied by the transfer being processed.

As suggested by the dotted arrows from the data path to the data count, the data count is updated for each unit of data that is transferred by the buffer access circuit associated with the particular data count. The data count may represent a source data count if the associated buffer access circuit is transferring data from a source to the buffer memory. The source data count will be incremented for each data unit that is transferred to the buffer memory. The data count may represent a destination data count if the associated buffer access circuit is transferring data from the buffer memory to a destination. The destination data count will be decremented for each data unit that is transferred from the buffer memory.

As further suggested by the dotted arrows from the microprocessor control data path to the data count, the data count may also be changed by external commands. There may be an adjust command that adds or subtracts a value from the current data count. The adjust command may be an atomic operation performed by the buffered data transfer device in which the atomic operation prevents changes to the data count value while the value is being adjusted by deferring updates to the count by data transfers while the adjustment is in progress.

Figure 3:
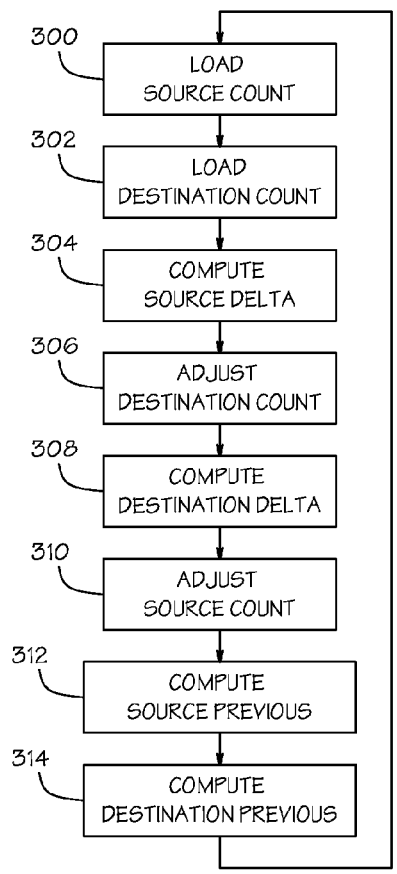
FIG. 3 is a flowchart for a method of controlling a buffered data transfer device that transfers data between a source and a destination according to one embodiment.

FIG. 3 illustrates a method for controlling a buffered data transfer between a source and a destination that embodies the invention. The buffered data transfer may be carried out by the buffered data transfer device 122. The buffered data transfer device includes counters that hold a source count value and a destination count value. The buffered data transfer device 122 is configured to transfer data from a source, such as the disk 116, to the buffer 126 and to increment the source count value for each unit of source data that is stored in the buffer. The buffered data transfer device 122 is further configured to transfer data from the buffer 126 to a destination, such as the interface 112 which may transfer the data to the processor memory 108, and to decrement the destination count value for each unit of destination data that is read from the buffer.

The buffered data transfer device 122 transfers data from the source to the buffer unless the source count value reaches a threshold value that indicates that the buffer is full. The buffered data transfer device 122 also transfers data from the buffer to the destination unless the destination count value reaches a zero value that indicates that the buffer is empty (which may or may not be the number value of zero).

It will be appreciated that the buffered data transfer device 122 has been configured to perform two transfers that share the same buffer memory but are otherwise independent. Thus when the source count value reaches the threshold value the transfer from the source to the buffer may stop and may not resume without adjustment to the buffered data transfer device 122. Likewise, when the destination count value reaches the zero value the transfer from the buffer to the destination may stop and may not resume without adjustment to the buffered data transfer device 122. The method for controlling the buffered data transfer provides, in part, adjustments to the buffered data transfer device 122 so that an overall transfer of data between a source and a destination will proceed to completion.

The source count value 300 and the destination count value 302 are loaded from the buffered data transfer device 122. The source count value may be a first count of data units in the buffer that is adjusted by a source device data transfer. The destination count value may be a second count of data units in the buffer that is adjusted by a destination device data transfer.

A source delta value is computed by subtracting a source previous value from the source count value 304. Initially the source previous value is zero. The destination count value on the buffered data transfer device 122 is adjusted by adding the source delta value to the destination count value 306.

A destination delta value is computed by subtracting a destination previous value from the destination count value 308. Initially the destination previous value is zero. The source count value on the buffered data transfer device 122 is adjusted by adding the destination delta value to the source count value 310.

A new value for the source previous value is computed by adding the source count value and the destination delta value 312. A new value for the destination previous value is computed by adding the destination count value and the source delta value 314. The method then repeats on a periodic basis.

It may be observed that the method periodically samples the source count value 202 and the destination count value 200 maintained by the buffered data transfer device 122 and adjusts the count values based on computations involving the sampled values. It will be appreciated that the count values maintained by the buffered data transfer device 122 are dynamic values that may change asynchronously while the method is performed. It is significant that the method may be carried out without regard to the possibility of changes in the count values maintained by the buffered data transfer device 122 as the method is performed. Adjusting the source count value and adjusting the destination count value on the buffered data transfer device may use atomic operations performed by the buffered data transfer device.

Figure 4:
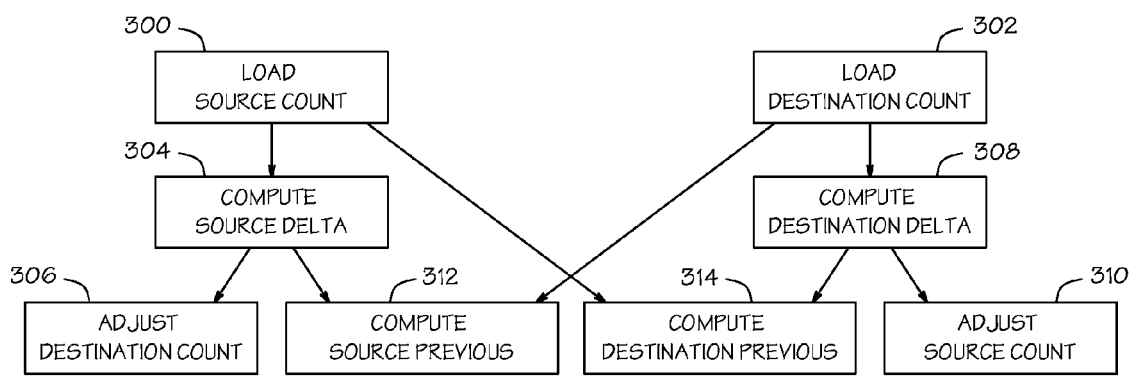
FIG. 4 is a chart showing example dependencies for the embodiment of controlling a buffered data transfer device shown in FIG. 3 according to one embodiment.

The method for controlling the buffered data transfer may be carried out by performing each part of the method sequentially as shown in FIG. 3 or by performing certain parts in parallel. The parts of the method also may be carried out in various orders. FIG. 4 illustrates one embodiment that connects the boxes representing parts of the method with arrows to represent possible dependencies between the parts shown rather than to represent a particular order of performing the parts. In this embodiment, the parts may be performed in any order that satisfies the dependencies.

Certain embodiments of the invention for controlling the buffered data transfer may be advantageous if the source and the destination transfer data units are of different sizes. The source count value may be a first count of data units in a buffer that is adjusted by a source device data transfer and the destination count value may be a second count of data units in the buffer that is adjusted by a destination device data transfer. If the buffered access circuits 124, 128 increment and decrement the source and destination counters based on the number of data units transferred, it will be appreciated that the disparate size of the data units may need to be accommodated to correctly manage the buffered transfer.

Figure 5:
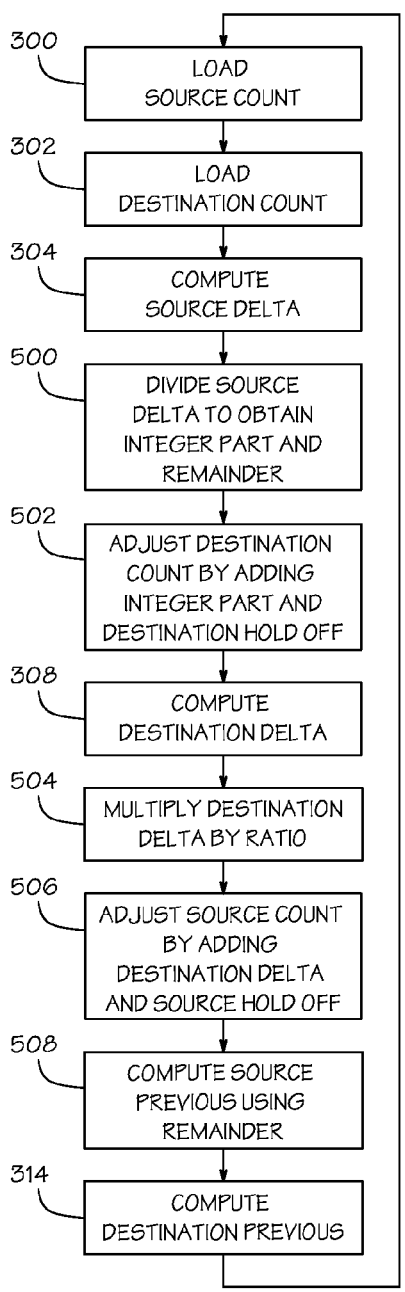
FIG. 5 is a flowchart for another method of controlling a buffered data transfer device that transfers data between a source and a destination according to one embodiment.

FIG. 5 shows a flowchart for an embodiment of the invention that accommodates a size difference of the data transfer units where there is an integer ratio between the size of the destination transfer data units and the size of the source transfer data units. The source delta value may be divided by the ratio before adjusting the destination count value to obtain an integer part and a remainder of the source delta value 500. The destination count value may be adjusted by adding the integer part of the source delta value to the destination count value 502. The destination delta value may be multiplied by the ratio 504 before adjusting the source count value 506. The source previous value may be computed by adding the source count value and the destination delta value, and subtracting the remainder of the source delta value 508.

Figure 6:
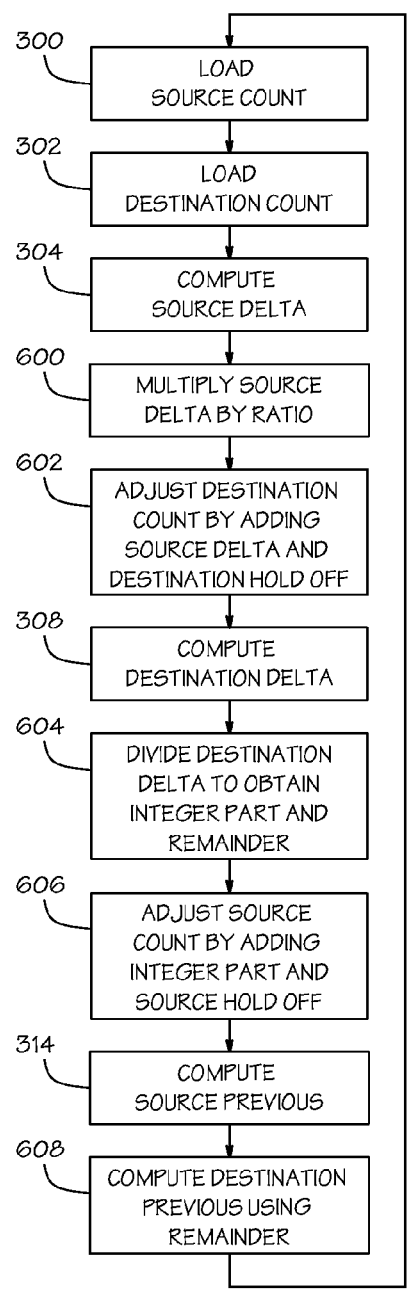
FIG. 6 is a flowchart for another method of controlling a buffered data transfer device that transfers data between a source and a destination according to one embodiment.

FIG. 6 shows a flowchart for an embodiment of the invention that accommodates a size difference of the data transfer units where there is an integer ratio between the size of the source transfer data units and the size of the destination transfer data units. The source delta value may be multiplied by the ratio 600 before adjusting the destination count value 602. The destination delta value may be divided by the ratio before adjusting the source count value to obtain an integer part and a remainder of the destination delta value 604. The source count value may be computed by adding the integer part of the destination delta value to the source count value 606. The destination previous value may be computed by adding the destination count value and the source delta value, and subtracting the remainder of the destination delta value 608.

Certain embodiments of the invention for controlling the buffered data transfer may also be advantageously used to delay availability of source data for transfer to the destination. For example, source availability may be delayed to permit error checking of the source data transferred to the buffer before it is transferred to the destination. Source availability may be delayed by reducing the destination delta value by a source transfer hold off value before using the value to adjust the source count value on the buffered data transfer device 506, 606. The source transfer hold off value is the number of source transfer data units in the buffer that are not available for transfer to the destination.

Certain embodiments of the invention for controlling the buffered data transfer may also be advantageously used to delay availability of the buffer for reuse by source data transfers to the buffer. For example, buffer availability may be delayed to permit additional use of the source data transferred to the buffer after the initial transfer to the destination. As a further example, buffer availability may be delayed to permit transfer from the buffer to the destination in a different order from that in which it is stored. Buffer availability may be delayed by reducing the source delta value by a destination transfer hold off value before using the value to adjust the destination count value on the buffered data transfer device 502, 602. The destination transfer hold off value is the number of destination transfer data units in the buffer that are not available for receiving data from the source.

Figure 7:
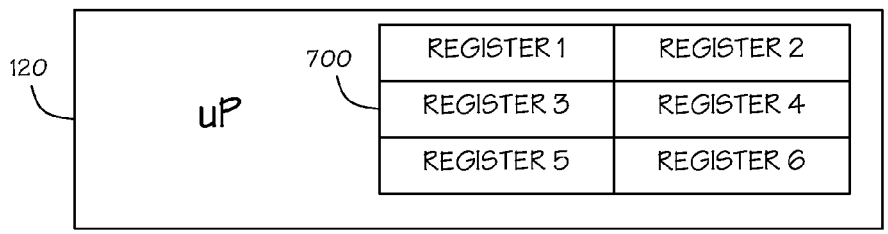
FIG. 7 is a block diagram of a processor that may be used in a controller for controlling a buffered data transfer device according to one embodiment.

FIG. 7 shows a block diagram of a processor 120 from a controller for controlling a buffered data transfer device that transfers data between a source and a destination according to one embodiment of the invention. The processor 120 may be coupled to at least six registers 700 for holding values to be used in computations. In the embodiment shown, the registers 700 are included in a microprocessor or microcontroller. In other embodiments, the processor 120 may be in the form of discrete logic, a programmable logic controller, or other device that can perform the necessary computational and logical operations. The registers 700 may be integrated with or separate from the processor.

The registers 700 may be allocated as follows, where the ordinal designations are for clarity of presentation but are not otherwise significant. A first register receives a source count value from a buffered data transfer device. The source count value is a first count of data units in a buffer in the buffered data transfer device that is adjusted by a source device data transfer. The destination count value is a second count of data units in the buffer that is adjusted by a destination device data transfer. A second register receives a destination count value from the buffered data transfer device. A third register stores a source previous value. A fourth register stores a destination previous value. A fifth register stores a source delta value. A sixth register stores a destination delta value.

The processor 120 may perform operations including the following. Subtracting the source previous value in the third register from the source count value in the first register and storing the result as the source delta value in the fifth register. Sending a destination count adjustment command that includes the source delta value to the buffered data transfer device. Subtracting the destination previous value in the fourth register from the destination count value in the second register and storing the result as the destination delta value in the sixth register. Sending a source count adjustment command that includes the destination delta value to the buffered data transfer device. Adding the source count value in the first register and the destination delta value in the sixth register and storing the result as the source previous value in the third register. Adding the destination count value in the second register and the source delta value in the fifth register and storing the result as the destination previous value in the fourth register.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method for controlling a buffered data transfer between a source and a destination, the method comprising:
   loading a source count value from a buffered data transfer device;
   loading a destination count value from the buffered data transfer device;
   computing a source delta value by subtracting a source previous value from the source count value;
   adjusting the destination count value on the buffered data transfer device by adding the source delta value to the destination count value;
   computing a destination delta value by subtracting a destination previous value from the destination count value;

adjusting the source count value on the buffered data transfer device by adding the destination delta value to the source count value;

computing a new value for the source previous value by adding the source count value and the destination delta value; and computing a new value for the destination previous value by adding the destination count value and the source delta value.

2. The method of claim 1 wherein the source count value is a first count of data units in a buffer that is adjusted by a source device data transfer and the destination count value is a second count of data units in the buffer that is adjusted by a destination device data transfer.

3. The method of claim 2 wherein the first count is of data units of a first size and the second count is of data units of a second size with a ratio between the second size and the first size, the method further comprising:

value to obtain an integer part and a remainder of the source delta value;

adjusting the destination count value by adding the integer part of the source delta value to the destination count value;

multiplying the destination delta value by the ratio before adjusting the source count value; and computing the source previous value by adding the source count value and the destination delta value, and subtracting the remainder of the source delta value.

4. The method of claim 2 wherein the first count is of data units of a first size and the second count is of data units of a second size having a ration between the first size and the second size, the method further comprising:

multiplying the source delta value by the ratio before adjusting the destination count value;

dividing the destination delta value by the ratio before adjusting the source count value to obtain an integer part and a remainder of the destination delta value;

adjusting the source count value by adding the integer part of the destination delta value to the source count value; and computing the destination previous value by adding the destination count value and the source delta value, and subtracting the remainder of the destination delta value.

5. The method of claim 1 further comprising adjusting the source count value on the buffered data transfer device by adding the destination delta value reduced by a source transfer hold off value to the source count value.

6. The method of claim 1 further comprising adjusting the destination count value on the buffered data transfer device by adding the destination delta value reduced by a destination transfer hold off value to the destination count value.

7. The method of claim 1 wherein adjusting the source count value and adjusting the destination count value on the buffered data transfer device are atomic operations performed by the buffered data transfer device, the atomic operation preventing other changes to the value while the value is being adjusted.

8. A controller for controlling a buffered data transfer device that transfers data between a source and a destination, the controller comprising:

a first register to receive a source count value from the buffered data transfer device;

a second register to receive a destination count value from the buffered data transfer device;

a third register to store a source previous value;

a fourth register to store a destination previous value;

a fifth register to store a source delta value;

a sixth register to store a destination delta value;

a processor coupled to the first through sixth registers, the processor to perform operations including subtracting the source previous value in the third register from the source count value in the first register and storing the result as the source delta value in the fifth register, sending a destination count adjustment command that includes the source delta value to the buffered data transfer device, subtracting the destination previous value in the fourth register from the destination count value in the second register and storing the result as the destination delta value in the sixth register, sending a source count adjustment command that includes the destination delta value to the buffered data transfer device, adding the source count value in the first register and the destination delta value in the sixth register and storing the result as the source previous value in the third register, and adding the destination count value in the second register and the source delta value in the fifth register and storing the result as the destination previous value in the fourth register.

9. The controller of claim 8 wherein the source count value is a first count of data units in a buffer in the buffered data transfer device that is adjusted by a source device data transfer and the destination count value is a second count of data units in the buffer that is adjusted by a destination device data transfer.

10. The controller of claim 9 wherein: the first count is of source data units of a first size and the second count is of destination data units of a second size with a ratio between the second size and the first size;

the source delta value included in the destination count adjustment command is the integer part of the source delta value divided by the ratio, and the processor further subtracts the remainder of the source delta value divided by the ratio from the sum of the destination count value in the second register and the source delta value in the fifth register and stores the result as the destination previous value in the fourth register.

11. The controller of claim 9 wherein: the first count is of source data units of a first size and the second count is of destination data units of a second size having a ratio between the first size and the second size;

the destination value included in the source count adjustment command is the integer part of the destination delta value divided by the ratio, and the processor further subtracts the remainder of the destination delta value divided by the ratio from the sum of the source count value in the first register and the destination delta value in the sixth register and stores the result as the source previous value in the third register.

12. The controller of claim 8 wherein the processor further adjusts the source count value on the buffered data transfer device by adding the destination delta value reduced by a source transfer hold off value to the source count value.

13. The controller of claim 8 wherein the processor further adjusts the destination count value on the buffered data transfer device by adding the source delta value reduced by a destination transfer hold off value to the destination count value.

14. The controller of claim 8 wherein the destination count adjustment command and the source count adjustment command are atomic operations performed by the buffered data transfer device, the atomic operation preventing other changes to the value while the value is being adjusted.

15. A controller for controlling a buffered data transfer device that transfers data between a source and a destination, the controller comprising:
- means for receiving a source count value from the buffered data transfer device;
- means for receiving a destination count value from the buffered data transfer device;
- means for computing a source delta value by subtracting a source previous value from the source count value;
- means for adjusting the destination count value on the buffered data transfer device by adding the source delta value to the destination count value;
- means for computing a destination delta value by subtracting a destination previous value from the destination count value;
- means for adjusting the source count value on the buffered data transfer device by adding the destination delta value to the source count value;
- means for computing a new value for the source previous value by adding the source count value and the destination delta value; and
- means for computing a new value for the destination previous value by adding the destination count value and the source delta value.

16. The controller of claim 15 wherein the source count value is a first count of source data units in a buffer that is adjusted by a source device data transfer and the destination count value is a second count of destination data units in the buffer that is adjusted by a destination device data transfer.

17. The controller of claim 16 wherein the first count is of source data units of a first size and the second count is of destination data units of a second size with a ratio between the second size and the first size, the device further comprising:
- means for dividing the source delta value by the ratio before adjusting the destination count value to obtain an integer part and a remainder of the source delta value;
- means for adjusting the destination count value by adding the integer part of the source delta value to the destination count value;
- means for multiplying the destination delta value by the ratio before adjusting the source count value; and
- means for computing the source previous value by adding the source count value and the destination delta value, and subtracting the remainder of the source delta value.

18. The controller of claim 16 wherein the first count is of source data units of a first size and the second count is of destination data units of a second size having a ratio between the first size and the second size, the device further comprising:
- means for multiplying the source delta value by the ratio before adjusting the destination count value;
- means for dividing the destination delta value by the ratio before adjusting the source count value to obtain an integer part and a remainder of the destination delta value;
- means for adjusting the source count value by adding the integer part of the destination delta value to the source count value; and
- means for computing the destination previous value by adding the destination count value and the source delta value, and subtracting the remainder of the destination delta value.

19. The controller of claim 15 further comprising means for adjusting the source count value on the buffered data transfer device by adding the destination delta value reduced by a source transfer hold off value to the source count value.

20. The controller of claim 15 further comprising means for adjusting the destination count value on the buffered data transfer device by adding the source delta value reduced by a destination transfer hold off value to the destination count value.

21. The controller of claim 15 wherein the means for adjusting the source count value and the means for adjusting the destination count value on the buffered data transfer device are atomic operations performed by the buffered data transfer device, the atomic operation preventing other changes to the value while the value is being adjusted.

* * * * *